United States Patent [19]
Hunter et al.

[11] Patent Number: 6,161,176
[45] Date of Patent: Dec. 12, 2000

[54] SYSTEM AND METHOD FOR STORING CONFIGURATION SETTINGS FOR TRANSFER FROM A FIRST SYSTEM TO A SECOND SYSTEM

[75] Inventors: William Clifford Hunter, Kenmore; Jeffrey Eric Larsson, Seattle; Gordon B. Church, Kenmore, all of Wash.

[73] Assignee: Microsoft Corporation, Redmond, Wash.

[21] Appl. No.: 09/196,868

[22] Filed: Nov. 20, 1998

[51] Int. Cl.[7] .................................................. G06F 9/445
[52] U.S. Cl. ................................................. 713/1; 713/100
[58] Field of Search ................................. 713/1, 2, 100; 712/13, 14, 15–17; 709/108, 220, 222, 221, 302; 710/8

[56] References Cited

U.S. PATENT DOCUMENTS

| | | | |
|---|---|---|---|
| 4,959,772 | 9/1990 | Smith et al. | 714/48 |
| 5,506,949 | 4/1996 | Perrin | 345/473 |
| 5,874,988 | 2/1999 | Gu | 348/97 |

Primary Examiner—Reba I. Elmore
Assistant Examiner—Rijue Mai
Attorney, Agent, or Firm—Kilpatrick Stockton LLP

[57] ABSTRACT

Storing settings related to an application in a settings file for transport to a second computer. A software module reads an initialization file identifying the possible settings related to the application, and identifying the locations of those settings. The software module reads the settings from those locations, including a system registry as well as individual files associated with the application. The software module stores the settings in a settings file. The settings file is transported to the second computer, or the second computer reads the settings file over a network. The software module may execute at the second computer and write the settings from the settings file to the appropriate locations on the second computer.

24 Claims, 5 Drawing Sheets

SYSTEM AND METHOD FOR STORING CONFIGURATION SETTINGS FOR TRANSFER FROM A FIRST SYSTEM TO A SECOND SYSTEM

TECHNICAL FIELD

The present invention generally relates to storing configuration settings for transfer from a first system to a second system. More particularly, the present invention relates to software applications for reading and storing configuration settings from a first computer for transfer to a second computer.

BACKGROUND OF THE INVENTION

When a computer user first installs an application on a computer, generally an installation procedure is performed. The installation procedure writes files and information to appropriate locations on the computer. Often, core files, such as executable files or libraries of subroutines, for the application are written to an application directory or folder in the computer's file system. In addition to those core files, the installation procedure may write individual files to the application directory or to another directory. For instance, a configuration file may include information used by the application to configure certain features of the application at run-time. Often, the information in the configuration file can be modified from the application to personalize the features of the application for the user, or to modify the performance of the application.

In addition to the configuration file, many applications make use of other individual files to support the functionality of the application. One example of such an individual file is a "template" file. Template files are often used by an application as a model for each new document created by the application. The template file may include information defining desired characteristics for the new documents. The installation procedure may create a template file which is pre-configured for a particular set of document characteristics. A user may modify the template file, usually through the application, to alter the desired characteristics of new documents.

The installation procedure may also write information to a registration database, or "registry," maintained by the operating system of the computer. The registry may be a file maintained by the operating system which defines certain features and characteristics of applications installed on the computer. For instance, the registry may identify the location in the directory structure for the application and the individual files, such as the configuration file and the template file. Unlike the individual files discussed above, the registry is maintained by the operating system. Consequently, the location of the registry should not vary from computer to computer, which makes the information in the registry easily locatable by applications executing on the computer.

Many computer users complain that setting up a second computer can be a difficult and time consuming task. Any software installed on the first computer must be installed on the second computer. If the user modified any of the features and characteristics of the applications on the first computer, those modifications are not reflected on the second computer. The installation procedure generally installs an application with a pre-configured set of default characteristics. Therefore, the user must also spend time making the same modifications to the features and characteristics on the second computer if a similar interface is desired between the first and second computers. The customizations and user settings contained in the various files discussed above are collectively termed "the settings."

A related problem exists when system administrators attempt to install applications on several computers in an enterprise-wide environment such that all of the computers exhibit the same user interface. If a user of one computer in the network modifies the settings at that computer, then that computer does not have the same user interface as other computers in the network. Those problems are heightened when the settings are maintained in several different locations, such as in the registry and in the individual files discussed above.

Unfortunately, existing mechanisms for transferring settings from the first computer to the second computer do not adequately address the need to retrieve settings from the individual files as well as the registry. Generally, existing mechanisms are limited to retrieving settings from the registry of the first computer. Existing mechanisms do not retrieve settings from the individual files for transport to the second computer. Accordingly, there is a need in the art for a mechanism by which configuration settings, including those in computer files separate from an operating system registry, may be transferred to other computers.

SUMMARY OF THE INVENTION

The present invention provides the ability to transfer configuration settings related to a computer application (termed "the settings") from one computer to a second computer. The settings may reside in both a registry file maintained by the computer operating system and individual files maintained by the application. The invention provides a software module, such as a wizard, which, when executed, is operative to identify and retrieve the settings from the registry file and from the individual files.

The software module reads an initialization file which defines what settings to look for and locations on the computer to look for the settings. For example, the initialization file may indicate to the software module that settings related to the application's user interface are kept in the registry file, and that settings related to default operating characteristics for the application are kept in a default template file. The software module then accesses the various locations, which may include the computer registry or individual files, to identify the settings. It will be apparent to those skilled in the art that some of the settings defined in the initialization file may be absent from the defined locations. For instance, the application may only write setting information when the setting has been altered from its default value. In one example, the software module may look for a toolbar-related setting in the registry file, but the setting may be absent. The absence of the toolbar-related setting may indicate to the software module that the toolbar-related setting has not been changed from its default value. In that case, the software module will understand that the toolbar-related setting is not one which must be retrieved.

Once the software module has identified all of the settings by reading them from the registry file or any individual files, then a settings file is created. All of the settings which are identified by the software module are written to the settings file in a manner which may be understood by the software module. The settings file may be a portable file capable of storage on a floppy disk or other removable computer media capable of being transported from one computer to another. Likewise, the settings file may be stored on a network-accessible storage media or any other location accessible by a plurality of computers. For simplicity, the following discussion assumes the settings file is stored on a floppy disk.

The settings file may then be transported to a second computer which a user desires to reflect the settings. The second computer may also have the application installed, but the current settings of the application on the second computer vary in some fashion from the settings of the application on the first computer. The software module may then be executed at the second computer and instructed to restore the settings from the settings file to the second computer. The software module may then read the settings file and write the settings to the second computer. The settings in the settings file may be identified by their appropriate location, such as in the registry file or in an individual file maintained by the application. Accordingly, the software module will write the settings to the appropriate location.

In this manner, a user of a first computer may execute the software module on the first computer to create a settings file reflecting the user's settings at the first computer. The user may then execute the software module at a second computer and retrieve the settings from the settings file and transfer them to the second computer. In another embodiment, a system administrator may set up a lab computer with a particular set of enterprise-adopted settings. The system administrator may create a settings file reflecting the enterprise-adopted settings from the lab computer. Then, the system administrator may transfer those settings to each computer in the enterprise by executing the software module at each computer. The settings file may be maintained at a network-accessible location. Preferably, the system administrator may set up each computer to execute the software module at start-up through the use of a start-up script or the like.

Other features, aspects, and advantages of the present invention will become apparent upon reading the following detailed description of the embodiments, taken in conjunction with the drawings and the claims.

DETAILED DESCRIPTION OF THE INVENTION

The present invention provides a method for transferring settings for an application program between computer systems. The method reads an initialization file identifying the possible settings related to the application, and identifies the locations of the settings. The locations of the settings include a system registry, as well as individual files associated with the application. The settings are read from the identified location and stored in a settings file. The settings file is transported to a second computer by disk, or the second computer reads the settings file over a network. The method may then write the settings from the settings file to the appropriate locations on the second computer.

Exemplary Operating Environment

Figure 1:
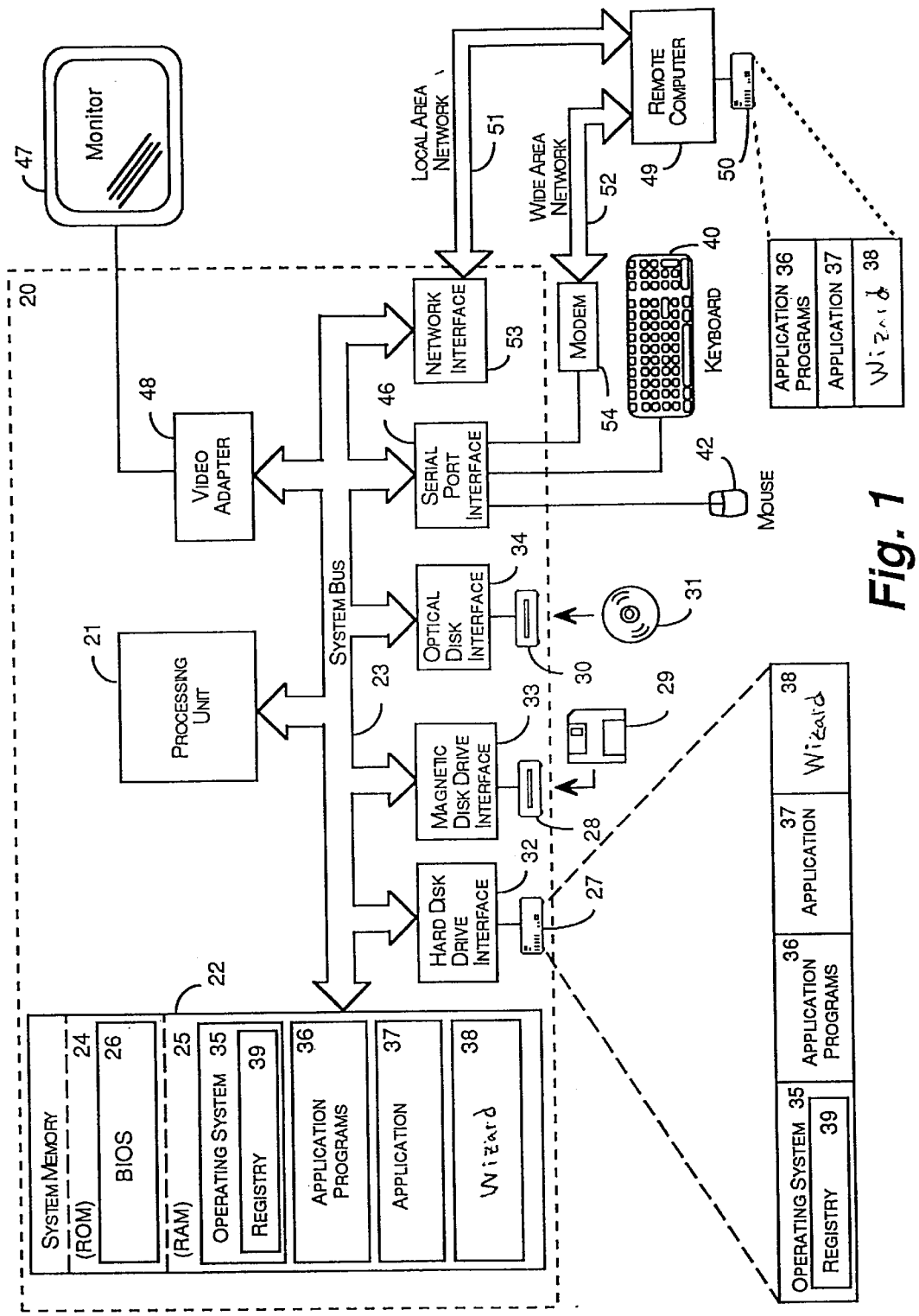
FIG. 1 is a block diagram of a computer that provides a portion of the operating environment for an exemplary embodiment of the present invention

FIG. 1 and the following discussion are intended to provide a brief, general description of a suitable computing environment in which the invention may be implemented. While the invention will be described in the general context of a program module that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as application 37, or other program modules, such as "wizard" 38. The wizard 38 is a program module capable of reading and writing settings and other information from and to various other files. The wizard 38 is discussed in greater detail below with respect to FIG. 2. Application 37 may include individual files, not shown, which contain settings associated with application 37. The operating system 35 may include a registry 39 which also contains settings associated with application 37.

A user may enter commands and information into the personal computer 20 through a keyboard 40 and pointing device, such as a mouse 42. Other input devices (not shown) may include a microphone, joystick, game pad, satellite dish, optical scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets or the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Exemplary Embodiment

Figure 2:
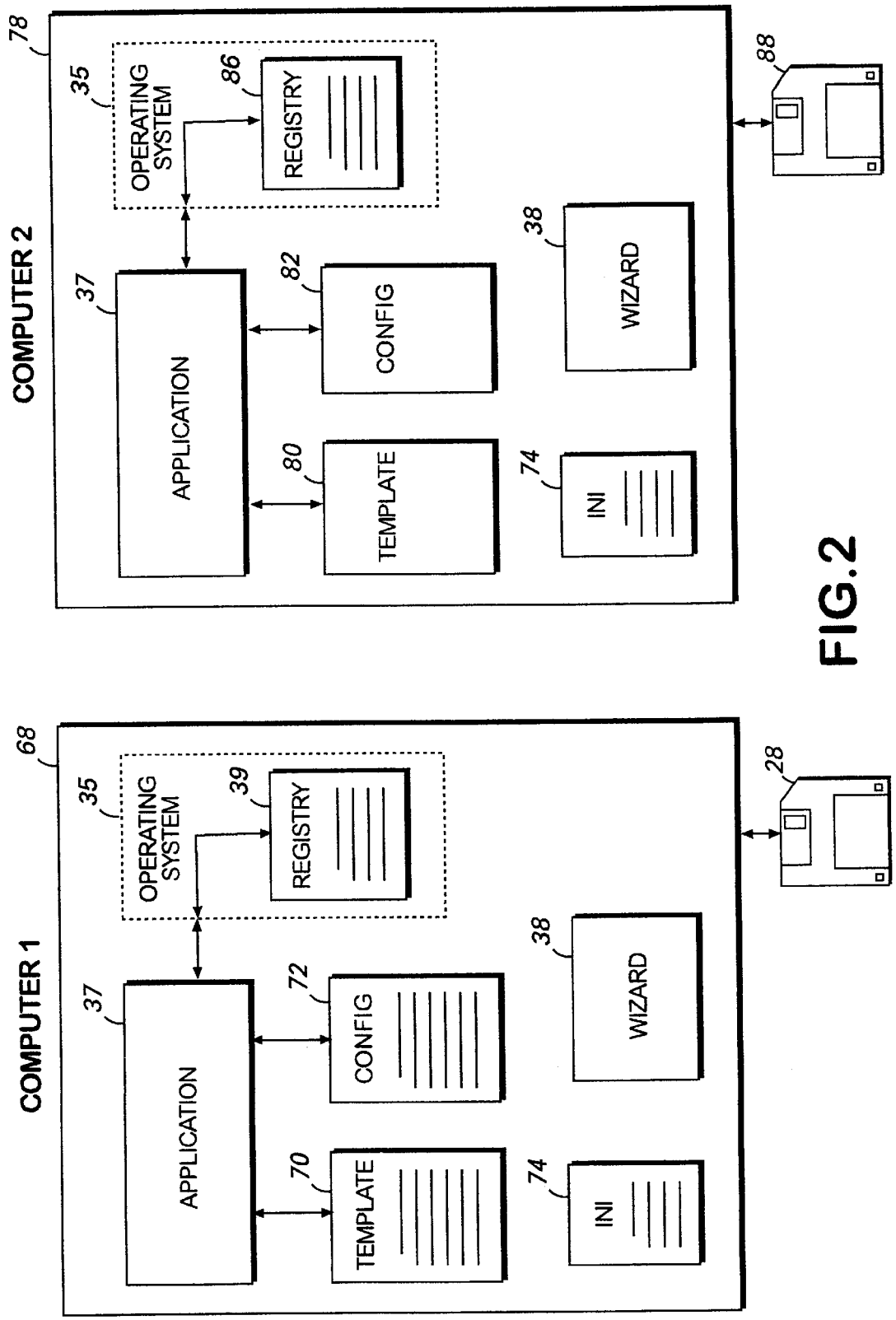
FIG. 2 is a more-detailed block diagram of an environment in which an exemplary embodiment of the present invention may transfer settings from a first computer to a second computer.

FIG. 2 is a functional block diagram illustrating one embodiment of an environment in which the present invention may operate. Depicted are a first computer 68 and a second computer 78. The first computer 68 has application 37 installed. Application 37 may be a word processing application program, a spreadsheet application program, or an office productivity suite including multiple such application programs. Associated with application 37 are two individual files, a template file 70 and a configuration file 72. The template file 70 may include settings such as default font styles or margins for documents created by application 37. The configuration file 72 may include settings such as special toolbar configurations or font substitutions for application 37. Although in the disclosed embodiment a template file 70 and a configuration file 72 are described, those skilled in the art will appreciate that application-related settings may reside in a single individual file which may be any file resident on the first computer 68 or accessible by the application 37 from the first computer 68, such as over the LAN 51 or WAN 52. The use of a configuration file 72 and a template file 70 in this description is for simplicity of discussion only, and it is envisioned that any settings related to the application 37 may reside in one or more individual files either related or unrelated to the configuration file 72 or the template file 70.

Those skilled in the art will appreciate that the template file 70 and the configuration file 72 may contain entries which reflect default settings established when application 37 was installed. Alternatively, the template file 70 or the configuration file 72 may not contain entries for certain settings unless those settings have been changed from a default. In other words, certain features of application 37 may have default properties which are not defined by an entry in the template file 70 or the configuration file 72 until the properties are changed from default. For example, application 37 may provide a user with the ability to create a special toolbar configuration in addition to the default toolbar configurations of application 37. Prior to the user creating such a special toolbar configuration, the configuration file 72 will not include an entry for special toolbar configurations. However, if the user creates a special toolbar configuration, it may be stored in the configuration file by creating a new entry. Accordingly, the template file 70 and the configuration file 72 may include entries which reflect default settings that were defined at installation by an installation procedure, or entries which reflect settings modified by the user since installation.

The locations of the template file 70 and the configuration file 72 may be either pre-defined locations or arbitrary locations. For instance, at installation, application 37 may suggest a default location for the template file 70 and the configuration file 72. If the user accepts the default location, the template file 70 and the configuration file 72 are installed to the pre-defined default locations. However, if the user changes the location for installation, then the template file 70, the configuration file 72, or both files may be installed at locations determined by the user.

The registry 39 also contains settings for application 37. The registry 39 is a file maintained by the operating system 35 which contains settings for many or all installed application programs 36, including application 37. The registry 39 may contain settings such as the location of application 37 in the file structure of the first computer 68, and the locations of the template file 70 and the configuration file 72. The registry 39 may include many other settings related to application 37, as will be known to those skilled in the art.

The wizard 38 is a software program module which is capable of reading, storing, and writing settings to the registry 39 and other individual files, such as the template file 70 or the configuration file 72. Those skilled in the art will appreciate that the term "wizard" is often used to refer to a program module which automates routine tasks otherwise performed manually. Wizards are often used to query a user in natural language and then to perform more complex tasks in response to the user's reply to the query. Wizards are used to make more complex tasks easier for the user to understand by prompting the user with simple, natural-language queries and then performing the more-complex tasks on behalf of the user.

An initialization ("IN") file 74 also resides on the first computer 68. The INI file 74 is associated with the wizard 38 and contains information related to application 37. The information includes an identifier for each setting that application 37 may have, and the location where that setting should be maintained. For instance, the INI file 74 may indicate that certain global settings pertaining to application 37 are maintained in the registry 39, that certain document-related settings are maintained in the template file 70, and that certain interface-related settings are maintained in the configuration file 72. All the possible settings related to application 37 may be identified in the INI file 74. Moreover, the INI file 74 may identify the locations within the directory structure of the first computer 68 where the individual files reside, such as the template file 70 and the configuration file 72.

The exemplary INI file 74 may be a text file or a binary file and contain a listing of the registry keys in which settings related to application 37 reside. For example the INI file 74 may indicate that the settings related to application 37 are maintained in an "HKEY_CURRENT_USER" portion of the registry. An exemplary entry in the INI file 74 identifying registry keys may be:

[IncludeRegistryTrees]
　　#Registry trees are relative to HKEY_CURRENT_USER
　　Software\Microsoft\Office\9.0
　　Software\Microsoft\Office\9.0\Access
　　Software\Microsoft\Office\9.0\Excel
　　Software\Microsoft\Office\9.0\Common Such an entry may indicate that the identified registry keys contain settings related to application 37. For instance, the entry "Software\Microsoft\Office\9.0" may indicate to the wizard 38 that the registry key "Software\Microsoft\Office\9.0," which is located under the HKEY_CURRENT_USER registry tree, may contain settings related to the application 37. Those skilled in the art will appreciate that the settings may appear as variables having defined values located under the identified registry key ("Software\Microsoft\Office\9.0").

An alternative form of entry in the INI file 74 may use tokens to identify under which registry tree a series of registry keys may be found. One example of such an alternative form of entry in the INI file 74 may be:

```
[IncludeRegistryTrees]
#<HKCR>=HKEY_CLASSES_ROOT
#<HKLM>=HKEY_LOCAL_MACHINE
#<HKU>=HKEY_USERS
<HKCU>\Software\Microsoft\Office\9.0
``` where the token "<HKCU>" is substituted for the registry tree path "HKEY_CURRENT_USER." It should be noted that tokens, such as "<HKCU>" above or "<AppData>" below may be used in the INI file 74 rather than attempting to define particular locations within the registry 39 where settings may be stored. The use of tokens becomes important when different computers store information in a registry, such as registry 39, in a disparate manner, such as in different languages. The situation exists that a standard registry path to a known setting may have two different values based on differences in a particular computer. For instance the registry path to an "<AppData>" value on an English-based computer may differ from the registry path on a German-based computer for the same value. Accordingly, tokens may be used to replace the actual registry path and which are resolved by each computer's operating system.

The INI file 74 also includes entries identifying special directories in which reside individual files, such as template file 70 and the configuration file 72. An exemplary entry in the INI file 74 identifying such a directory may be:

[IncludeFiles]
　　#Wildcards in the filename are supported
　　<AppData>\Microsoft\Word\Normal.dot That entry may indicate that the individual file "Normal.dot" is located in the sub-folder "Microsoft\Word" of the folder defined by the value of "<AppData>" in the registry 39 of the first computer 68, and that the wizard 38 should look for settings in that file.

While the INI file 74 is tailored for application 37, other INI files may be created which are tailored for other application programs 36. In addition, the INI file 74 need not be separate from the wizard 38. For instance, the information contained within the INI file 74 may also reside within the computer-executable code of the wizard 38 itself, or another software module, such as the application 37. In that case, the INI file 74 would not be a separate file from the wizard 74, but rather could be a portion of the computer-executable code forming the wizard 74 or other software module.

The first computer 68 also includes a communication mechanism for providing access to the files stored on the first computer 68. In the described embodiment, that mechanism is a disk drive 28. However, those skilled in the art will understand that other mechanisms may be used, such as the optical disk drive 30, the modem 54, or the network interface 53 described above respecting FIG. 1. The disk drive 28 allows a user to transfer files from the first computer 68 to a floppy disk, such as floppy disk 29, for transport to another computer, such as second computer 78.

The second computer 78 includes many of the same elements as the first computer 68. The application 37 may be installed on the second computer, including a template file 80 and a configuration file 82. The wizard 38 is also installed on the second computer 78. In addition, the operating system 35 on the second computer 78 includes a registry 86 which contains settings for each of the application programs 36, such as application 37, installed on the second computer 78. The registry 86 on the second computer 78 performs the same function as the registry 39 on the first computer 68. The entries in each registry 39, 86 are dependent on the particular application programs 36 installed on the first computer 68 or the second computer 78, respectively. The INI file 74 may also be installed on the second computer 78, although for certain functions, the INI file 74 may not be needed at the second computer 78. For instance, for operations of the wizard 38 which do not require reading the INI file 74, as are developed more fully below, the INI file 74 may be omitted from the second computer 78.

Those skilled in the art will appreciate that application 37 may be installed on the second computer 78 independently of the first computer 68. As a user makes changes to application 37 on the first computer 68, those changes are not reflected on the second computer 78. Accordingly, even though application 37 resides on both the first computer 68 and the second computer 78, the user settings of application 37 may not result in the same characteristics or operation on both computers 68, 78 because the registries 39, 86, the template files 70, 80 and the configuration files 72, 82 may contain different settings between the two computers 68, 78.

Those skilled in the art will also appreciate that application 37 may not be installed on the second computer 78. The installation procedure of certain application programs will not overwrite settings which have been previously written to the second computer 78. Therefore, if the application 37 may be installed on the second computer 78 without overwriting previously written settings, then the settings from the first computer 68 may be transferred to the second computer 78 before the application 37 is installed on the second computer 78.

The second computer 78 also includes a communication mechanism for accessing files on the second computer 78 or for transferring files to the second computer 78. In the disclosed embodiment, that communication mechanism is a disk drive 88. As with the first computer 68, the disk drive 88 could alternatively be any communication mechanism which allows access to the file system of the second computer 78.

Figure 4:
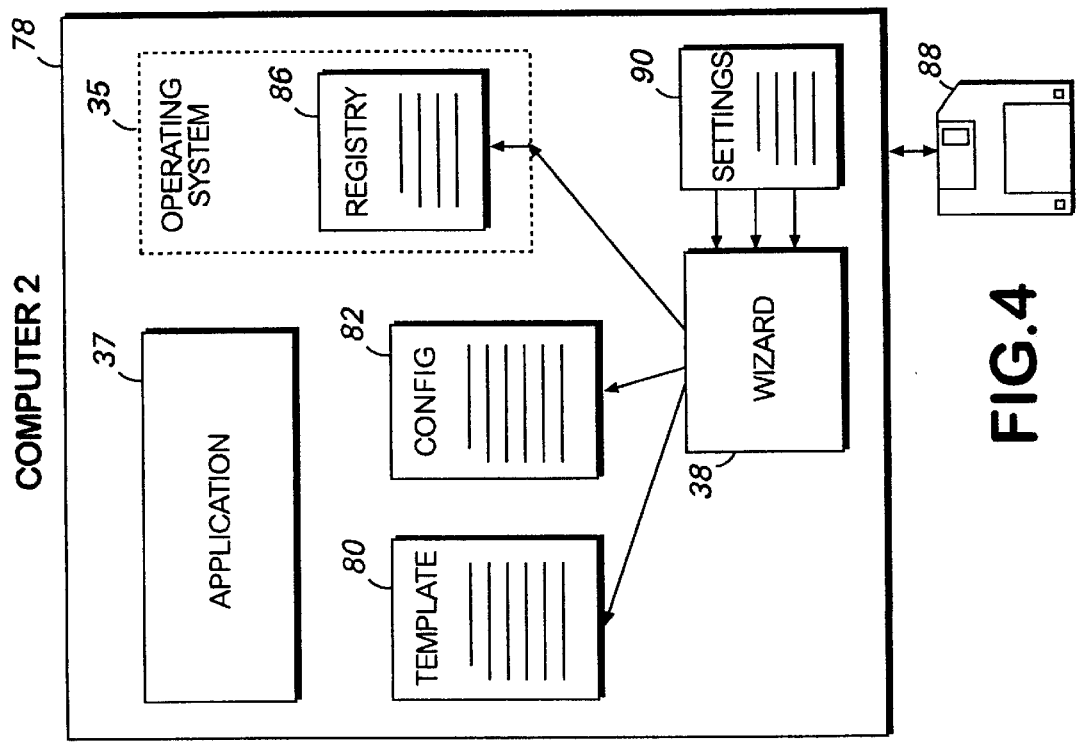
FIG. 4 is a block diagram of an exemplary embodiment for restoring settings to a second computer.
Figure 3:
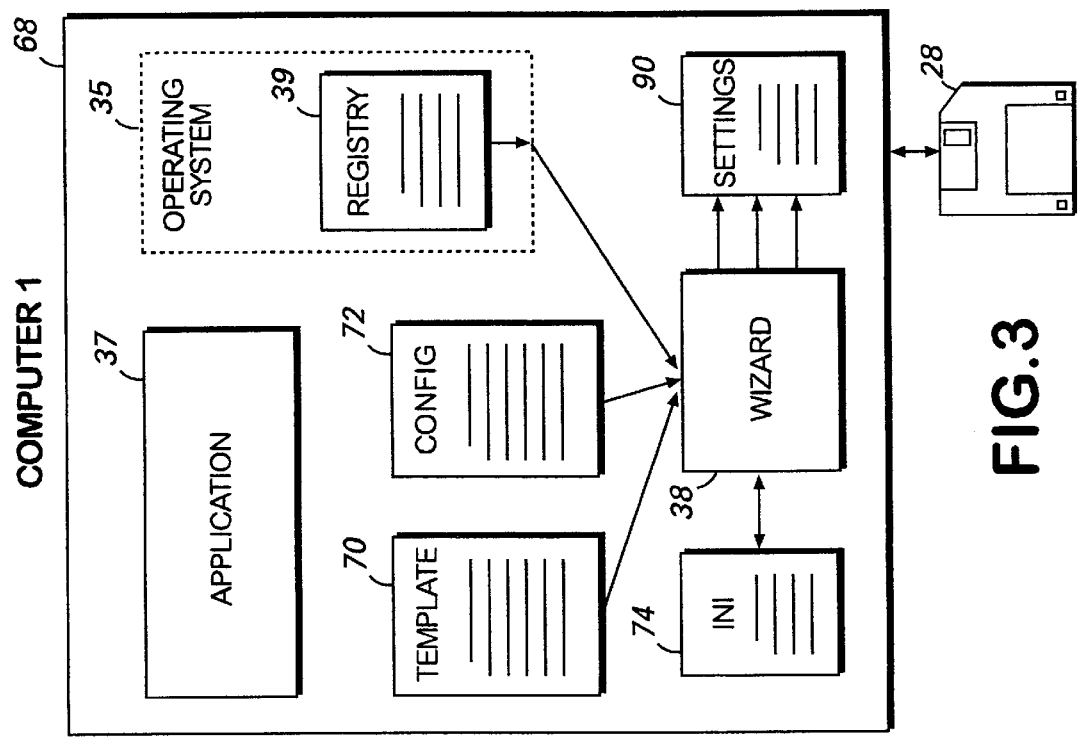
FIG. 3 is a block diagram of an exemplary embodiment for retrieving settings from a first computer.

FIGS. 3 and 4 are functional block diagrams which illustrate an exemplary scenario in which one embodiment of the present invention assists a user to transfer settings for application 37 from the first computer 68 to the second computer 78. To begin, in FIG. 3 the user has made changes to the default settings for application 37 on the first computer 68. For instance, the user may open a preferences display panel (not shown) in application 37 and alter particular check-boxes or textual configurations. The settings are saved in the registry 39, the template file 70, and the configuration file 72.

The user may initiate the settings transfer by executing the wizard 38. Those skilled in the art will appreciate that executing the wizard 38 can be achieved by double-clicking on an icon which represents the wizard 38, by executing the wizard 38 from a startup script which runs at system startup, or any other method of causing the wizard 38 to begin executing.

When the wizard 38 is executed, it may offer the user the option of retrieving settings from the first computer 68 or writing settings to the first computer 68. In this example, the user elects to retrieve the settings from the first computer 68 because the pertinent settings reside on the first computer 68. Accordingly, the wizard 38 opens the INI file 74 to identify which settings to retrieve. As noted above, the INI file 74 includes entries corresponding to each setting possible for application 37, and a location for each of those settings. For example, the INI file 74 may include names of directories and subdirectories in which are stored the template file 70 and the configuration file 72.

Those skilled in the art will appreciate that the locations of the template file 70 and the configuration file 72 may be defined relative to the location of application 37. For instance, the INI file 74 may indicate that the template file 70 is stored in a "Templates" subdirectory located under the root directory for application 37. In that situation, the INI file 74 may indicate to the wizard 38 to query the operating system 35 for the root directory of the application 37. Those skilled in the art will understand that such a query may take the form of an Application Programming Interface ("API") call requesting the location of the root directory of application 37. The operating system 35 may read the registry 39 which contains that information, and return a value, such as "<App_Data>=Application Data," to the wizard 38. When it receives that value, the wizard 38 can locate the "Application Data" folder, and search the "Templates" sub-folder for the template file 70.

Returning to the example, once the wizard 38 has identified the location of each of the settings related to application 37, the wizard 38 proceeds to retrieve each of those settings. Retrieving the settings may include opening the registry 39 and reading registry keys which contain settings related to application 37. Retrieving the settings may also include accessing and opening individual files associated with application 37, such as the template file 70 and the configuration file 72. As noted above, including the locations of the individual files (i.e. the template file 70 and the configuration file 72) in the INI file 74 allows the wizard 38 to locate and retrieve settings for application 37 which are not stored in the registry 39.

In the disclosed embodiment, the wizard 38 retrieves the settings by accessing the registry 39, the template file 70, and the configuration file 72, and reading the settings from those files. As noted above, all of the possible settings related to application 37 may not be present. For instance, the INI file 74 may indicate to the wizard 38 that special toolbar settings are stored in the configuration file 72. However, unless the user has created a special toolbar, the configuration file 72 does not contain such a setting. In that case, the wizard 38 does not read a special-toolbar related setting from the configuration file 72.

In addition, the wizard 38 need not retrieve all the possible settings. As discussed above, if the user has not changed a setting from default, the wizard 38 need not retrieve the value for that setting because the setting contains a default value. In other words, the only settings which the wizard should retrieve from the first computer 68 are those which the user has modified. Retrieving only the modified settings greatly reduces the number of settings which the wizard 38 must store for transfer to the second computer 78. The situation where a setting is a default on the first computer 68 but has been modified on the second computer 78 is addressed in greater detail below.

Once the wizard 38 has retrieved all the settings related to application 37 from the first computer 68 which were modified, the wizard 38 writes those settings to a settings file 90. The settings file 90 may be any computer file which can store the settings from the first computer 68. The settings file 90 may include the settings and the location where the settings are stored. The settings file 90 may be a text file or a binary file and contain individual entries for each setting read from the first computer 68. In addition, the settings file 90 may include headings separating registry 39 settings from individual file settings.

In certain situations, a setting may refer to a location on the first computer 68 where other files related to application 37 may be found. For instance, a setting in the configuration file 72 may identify a directory path to a custom dictionary used by application 37. The directory path may point to a location associated with the current user logged on to the first computer 68. For example, if the logged on user is named "John Doe," the location for the custom dictionary may be:

<system root>\profiles\JDoe\Application Data\Microsoft\Office

If the current user of the second computer 78 is not logged on as "John Doe," then the directory path defined by the setting would be invalid for the second computer 78.

To reconcile situations similar to that just described, the wizard 38 may substitute an environment variable name for information in a setting if that information matches data associated with the environment variable name. An environment variable is a variable, maintained by the operating system 35, specific to a particular user or login session on the computer, and in which environment variable data is associated with an environment variable name. Environment variables are often created and maintained by a system administrator or the like.

Generally, environment variables as used by the wizard 38 define values for user-specific information. In the above example, an environment variable may be named "%userprofile%." When John Doe logs on, that variable is set to "<system root>\profiles\JDoe." Therefore, because the value of the setting related to the location of the custom dictionary includes data matching the "%userprofile%" environment variable data, when the wizard 38 writes that setting to the settings file 90, the environment variable name is substituted. Consequently, the resultant entry in the settings file 90 may be:

%userprofile%\Application Data\Nicrosoft\Office.

By substituting an environment variable name for information in a setting which matches the environment variable data, the settings file 90 can be user-independent. In other words, the settings in the settings file 90 are stripped of information which links the settings with a login session. In that manner, a system administrator may transfer the settings file 90 to many different computers in an enterprise-wide network without the fear that the settings are linked to any particular login session.

More specifically, the settings file 90 may be transferred to a floppy disk via disk drive 28. Alternatively, the settings file 90 may be transferred to a network server or any other location accessible by the second computer 78. For simplicity of discussion, the disclosed embodiment makes use of a disk drive 28 to transfer the settings file 90 to a floppy disk. The floppy disk may then be transported to the second computer 78, and the settings file 90 may be transferred from the floppy disk to the second computer via disk drive 88 (FIG. 4).

At FIG. 4, the settings file 90 is transferred to the second computer 78. At that point, the settings file 90 containing the settings from the first computer 68 resides on the second computer 78. The user may then execute the wizard 38 on the second computer 78. As with the first computer 68, when the user executes the wizard 38, the user may be prompted with an option to retrieve settings from or write settings to the second computer 78. In this example, the user elects to write settings to the second computer 78.

In response to the user's election, the wizard searches for the settings file 90 containing the settings from the first computer 68. The wizard 38 may prompt the user for the location of the settings file 90 or may search a pre-defined location. When it has located the settings file 90, the wizard 38 retrieves the settings from the settings file 90. As mentioned above, the settings file 90 includes the settings from the first computer 68 which were modified from their default values, and the locations for the settings.

The wizard 38 then proceeds to write the settings from the settings file to the appropriate locations on the second computer 78. For example, any settings in the settings file 90 which were retrieved from the template file 70 of the first computer 68 are written to the template file 80 of the second computer 78. Any settings in the settings file 90 which were retrieved from the configuration file 72 of the first computer 68 are written to the configuration file 82 of the second computer 78. And any settings in the settings file 90 which were retrieved from the registry 39 of the first computer 68 are written to the registry 86 of the second computer 78. Writing the settings to the proper locations may include making an API call to the operating system 35 of the second computer 78 to determine the installed location of application 37.

In addition, as discussed above, certain settings in the settings file 90 may include variable names where environment variable data formed a portion of the setting, or tokens where computer-specific information was replaced. In those instances, calls to the operating system 35 of the second computer 78 would produce the data for the environment variable or token, and that data could be substituted back into the setting. Keeping with the example above, if the user logged into the second computer 78 as "Jane Smith," then the "%userprofile%" variable on the second computer 78 may be defined as "<system root>\profiles\JSmith." In that case, when the setting for the location of the custom dictionary is written to the configuration file 82, the data "<system root>\profiles\JSmith" is substituted for the variable name "%userprofile%" and the resultant setting in the configuration file 82 may be:

<system root>\profiles\JSmith\Application Data\Microsoft\Office.

Those skilled in the art will appreciate that many other environment variables may be used and substituted for information in addition to directory paths or the like. Also, in an alternative embodiment, the setting may be written to the configuration file 82 with the variable name rather than substituting the variable data when the setting is written. In that case, the application 37 could poll the operating system 35 at run-time for the data associated with the variable name.

Turning now to another problem, it is possible that the second computer 78 does not have all default settings at the time the wizard 38 is executed. As noted above, only those settings which were changed from the default settings on the first computer 68 are reflected in the settings file 90. Therefore, the situation may occur that a setting is changed from the default setting on the second computer 78, but was not changed from the default setting on the first computer 68. In that situation, the setting will not be reflected in the settings file 90 because the setting on the first computer 68 was default. If only the settings reflected in the settings file 90 are transferred to the second computer 78, then, after the transaction, application 37 on the second computer 78 will have characteristics defined both by the settings from the first computer 68 and the settings from the second computer 78. The result is that application 37 on the second computer 78 may not have exactly the same features and characteristics as application 37 on the first computer 68.

The present invention addresses that problem by presenting the user with an option to reset all or a portion of the settings at the second computer 78 to default values prior to transferring the settings from the settings file 90. The option may allow the user to select settings which are desired to be reset, or may select a listing of settings to be reset. The listing of settings may be stored in the INI file 74. If that option is selected, the relevant settings on the second computer 78 are reset to their default values. Then, when the settings from the settings file 90 are transferred to the second computer 78, the characteristics of application 37 on the second computer 78 defined by the relevant settings will act exactly as they do on the first computer 68. That result is certain because the settings not present in the settings file 90 are, by definition, default settings. Therefore, by resetting the second computer 78 to the default settings prior to transferring the settings from the settings file 90, the second computer 78 is assured of reflecting the settings from the first computer 68.

Alternatively, if the user desires to retain the changed settings on the second computer 78, the user can elect not to reset the settings on the second computer 78. In that instance, after the transaction, all of the settings from the first computer 68 will be reflected on the second computer 78 as well as any changes that were made at the second computer 78 prior to the transaction. However, a change to a setting at the second computer 78 which coincides with a setting in the settings file 90 is overwritten.

Figure 5:
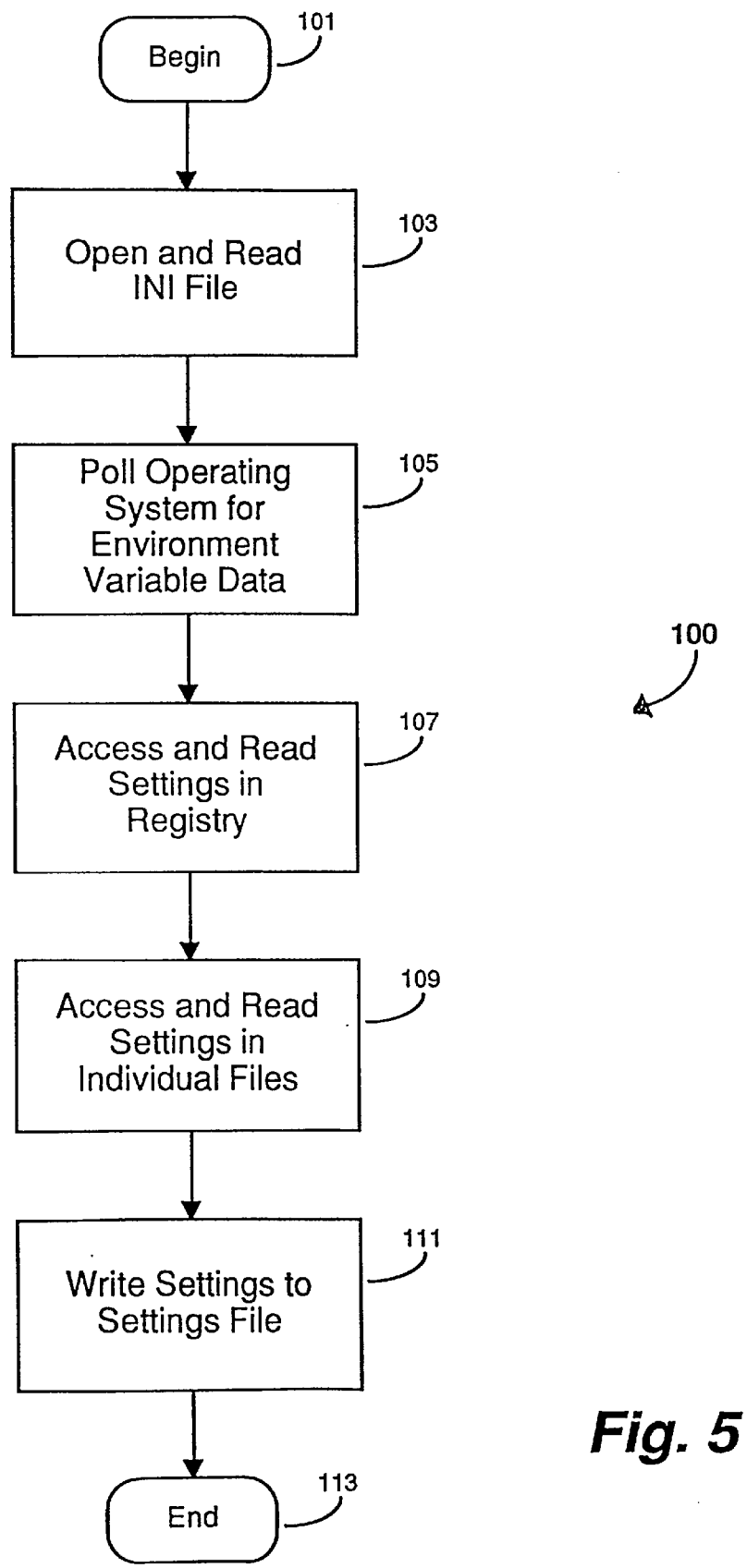
FIG. 5 is a flow diagram depicting steps performed by an exemplary embodiment to retrieve settings related to an application from a first computer.

FIG. 5 is a flow diagram 100 depicting steps performed to retrieve settings related to application 37 from the first computer 68. The flow diagram 100 enters at beginning step 101, where the wizard 38 has been initiated. In this example, the user elects to retrieve settings from the first computer 68, and processing continues at step 103.

At step 103, the wizard 38 opens and reads the INI file 74. The INI file 74 includes entries which identify the possible settings for application 37, and the locations of those settings. The INI file 74 may also contain a listing of particular environment variable names which may be substituted in certain settings if those settings include the environment variable data. Once the wizard 38 has identified the settings and locations, processing continues at step 105.

At step 105, the data for any environment variables identified in the INI file 74 is gathered by querying the operating system 35 of the first computer 68 for that information. Processing continues at step 107.

At step 107, the wizard 38 begins retrieving the settings from the first computer 68 from the locations identified in the INI file 74. The wizard 38 may begin by accessing the registry 39 of the first computer 68 and retrieving settings from that location. Processing continues at step 109.

At step 109, the wizard 38 retrieves the settings from individual files, such as the template file 70 and the configuration file 72, associated with application 37. Accessing those individual files may include first polling the operating system 35 to identify their locations in the directory structure. For instance, the individual files may be located in special directories identified in the INI file 74 of the first computer 68. Consequently, the wizard 38 may poll the operating system 35 for the locations of the special directories, the operating system 35 looks up the locations of the special directories in the registry 39, and the operating system 35 returns the locations to the wizard 38. Then the wizard 38 accesses the individual files located within the special directories and retrieves the relevant settings. Processing then continues at step 111.

At step 111, the wizard 38 has retrieved all of the settings related to application 37 which have been modified. The wizard 38 then writes those settings to a settings file 90. As discussed above, writing the settings to the settings file 90 may include substituting an environment variable name for data which matches the environment variable data in a particular setting. Processing then suspends at ending step 113.

Figure 6:
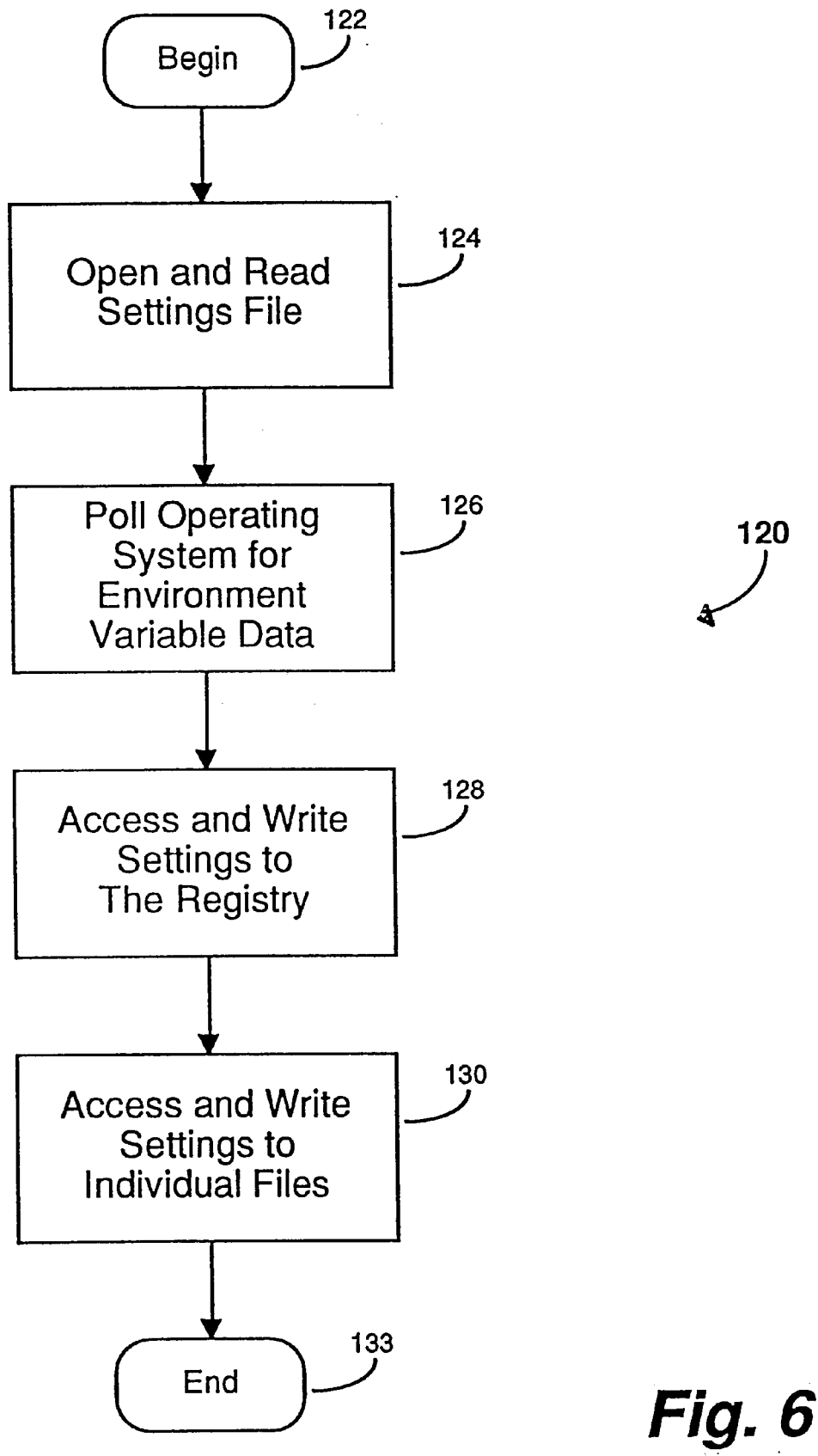
FIG. 6 is a flow diagram depicting steps performed by an exemplary embodiment to transfer settings to a second computer.

FIG. 6 is a flow diagram 120 depicting steps performed to transfer settings to a second computer 78. The flow diagram 120 enters at beginning step 122 where the settings file 90 is transferred to the second computer 78. The settings file 90 includes settings related to application 37 from the first computer 68. The settings may be identified as belonging in either the registry 86 of the second computer 78 or other individual files, such as the template file 80 or the configuration file 82, associated with application 37. Processing continues at step 124.

At step 124, the wizard 38, executing on the second computer 78, opens the settings file 90 and reads the settings. Reading the settings may include identifying each of the settings stored in the settings file 90 as well as identifying the location of each of the settings. Processing continues at step 126.

A setting in the settings file 90 may be stored such that a portion of the location of the setting is defined by an environment variable name, such as "%userprofile%." Therefore, at step 126, the wizard 38 may poll the operating system 35 of the second computer 78 to learn the values associated with any environment variables named in the settings file 90. Processing continues at step 128.

At step 128, the wizard 38 begins writing the settings to the appropriate locations on the second computer 78. The wizard 38 may begin by writing any settings to the registry 86. Those skilled in the art will appreciate that the registry 86 contains many settings for many, if not all, application programs 36 installed on the second computer 78. Processing continues at step 130.

At step 130, the wizard 38 may write settings to individual files, such as template file 80 and configuration file 82, associated with application 37. As noted above, the location of an individual file may be defined with relation to the user's personal login profile by using an environment variable, such as "%userprofile%," to signify that the individual file is located in the user's %userprofile% directory.

Those skilled in the art will appreciate that other environment variables may be used to identify the location of a particular individual file, or that the location of an individual file may be stored in a pre-defined location, such as the registry 86. Once all the settings have been written to the second computer 78, processing suspends at step 133.

From a reading of the above description pertaining to the disclosed embodiments of the present invention, modifications and variations thereto may become apparent to those skilled in the art. For instance, a start-up script may be used to initiate the wizard rather than a manual execution, a script file may be used to replace the wizard, the INI file may be stored on a network or other location, and the like. Therefore, the scope of the present invention is to be limited only by the following claims.

What is claimed is:

1. A computer-readable medium having computer-executable instructions for transferring configuration settings from a first computer to a second computer, the configuration settings including a first setting in a registry maintained by an operating system on the first computer and a second setting in an individual file associated with an application on the first computer, which when executed perform steps comprising:

(a) reading an initialization file containing a list of the configuration settings, the list including the first setting and the second setting, the initialization file further containing a location for the first setting and a location for the second setting, the location for the first setting being in the registry, and the location of the second setting being in the individual file associated with the application on the first computer;

(b) retrieving the first setting from the location for the first setting;

(c) retrieving the second setting from the location for the second setting; and (d) writing the first setting and the second setting to a settings file, the settings file being capable of transport to the second computer.

2. The computer-readable medium of claim 1, wherein the initialization file further identifies an environment variable name related to environment variable data, the environment variable data being associated with a particular login session on the first computer.

3. The computer-readable medium of claim 2, wherein the environment variable data defines a directory tree related to the particular login session on the first computer.

4. The computer-readable medium of claim 1, wherein the step of retrieving the first setting from the location for the first setting includes opening the registry and reading an entry in the registry related to the application.

5. The computer-readable medium of claim 1, wherein the step of retrieving the second setting from the location for the second setting includes accessing the individual file at the location of the individual file identified in the initialization file.

6. The computer-readable medium of claim 5, wherein the location of the individual file includes information related to a particular login session on the first computer.

7. The computer-readable medium of claim 6, wherein the information related to the particular login session includes data defined as an environment variable maintained by the first computer.

8. The computer-readable medium of claim 1, wherein the step of writing the first setting and the second setting to the settings file further includes substituting an environment variable name for a portion of one setting, the one setting being either the first setting or the second setting.

9. The computer-readable medium of claim 1, wherein the first setting represents a characteristic of the application and is different from a default setting for the characteristic.

10. A computer-readable medium having computer-executable instructions for transferring configuration settings from a first computer to a second computer, which when executed performs steps comprising:
  (a) at the second computer, accessing a settings file to retrieve a first setting, a second setting, a location for the first setting, and a location for the second setting, the first setting and the second setting being related to an application installed on the first computer, the location for the first setting being a registry file on the second computer and the location for the second setting being an individual file on the second computer;
  (b) at the second computer, writing the first setting from the settings file to the location for the first setting; and
  (c) at the second computer, writing the second setting from the settings file to the location for the second setting.

11. The computer-readable medium of claim 10, wherein the step of accessing the settings file further includes providing an option of writing the configuration settings to the second computer or reading new configuration settings from the second computer.

12. The computer-readable medium of claim 10, wherein the step of accessing the settings file at the second computer is initiated by a start-up script on the second computer.

13. The computer-readable medium of claim 10, wherein the step of accessing the settings file includes accessing the settings file over a network connected to the second computer.

14. The computer-readable medium of claim 10, wherein the location for the second setting includes an environment variable name related to a login session on the second computer.

15. The computer-readable medium of claim 14, wherein the environment variable name corresponds to information defining a portion of a directory tree related to the login session on the second computer.

16. The computer-readable medium of claim 15, wherein the step of writing the second setting to the location for the second setting includes substituting the information defining the portion of the directory tree for the environment variable name.

17. In a computer system, a method for transporting configuration settings related to a program module from a first computer to a second computer, the method comprising the steps of:
  (a) retrieving a first setting from a location of the first setting, the first setting being related to the program module, the location of the first setting being in a first system registry on the first computer;
  (b) retrieving a second setting from a location of the second setting, the second setting being related to the program module, the location of the second setting not being in the first system registry on the first computer;
  (c) storing the first setting and the second setting in a settings file;
  (d) reading the settings file at the second computer to retrieve the first setting and the second setting;
  (d) writing the first setting to a second system registry on the second computer; and
  (e) writing the second setting to a location on the second computer not being in the second system registry on the second computer.

18. The method of claim 17, wherein the step of storing the first setting and the second setting in the settings file further includes substituting an environment variable name for information in the first setting or the second setting matching information related to the environment variable name.

19. The method of claim 18, wherein the information related to the environment variable name includes a portion of a directory tree related to a particular login session on the first computer.

20. The method of claim 17, wherein the step of reading the settings file at the second computer includes reading the settings file over a network connected to the second computer.

21. The method of claim 17, wherein the step of writing the first setting to the second computer includes substituting information related to a particular login session on the second computer for a portion of the first setting.

22. The method of claim 17, wherein the step of writing the second setting to the second computer includes substituting information related to a particular login session on the second computer for a portion of the second setting.

23. The method of claim 21, wherein the information related to the particular login session includes a portion of a directory tree defined in relation to the particular login session.

24. A computer-readable medium having computer executable instructions for storing configuration settings for transfer from a first computer to a second computer, which when executed perform steps comprising:
  reading an initialization file, the initialization file including a first setting, a location of the first setting, a second setting, and a location of the second setting, the first setting and the second setting defining features and characteristics of an application, the application being installed on the first computer and the second computer;
  reading the first setting from the location of the first setting, the location of the first setting being in a registry file maintained by an operating system;
  reading the second setting from the location of the second setting, the location of the second setting being in an individual file associated with the application;
  writing the first setting and the second setting to a settings file at the first computer;
  writing the location of the first setting and the location of the second setting to the settings file at the first computer;
  transporting the settings file from the first computer to the second computer;
  at the second computer, reading the settings file to obtain the first setting, the second setting, the location of the first setting, and the location of the second setting;
  writing the first setting to the location of the first setting on the second computer; and
  writing the second setting to the location of the second setting on the second computer.

* * * * *